May 12, 1970 J. W. RAYMOND 3,511,720

METHOD OF INCREASING CRITICAL CURRENT DENSITY OF TITANIUM NIOBIUM BINARY SUPERCONDUCTIVE ALLOYS

Filed Aug. 8, 1966

2 Sheets-Sheet 1

INVENTOR.
JAN W. RAYMOND

BY Gerald A. Koris

ATTORNEY

INVENTOR.
JAN W. RAYMOND
BY
Gerald A. Koris
ATTORNEY

United States Patent Office 3,511,720
Patented May 12, 1970

3,511,720

METHOD OF INCREASING CRITICAL CURRENT DENSITY OF TITANIUM NIOBIUM BINARY SUPERCONDUCTIVE ALLOYS

Jan W. Raymond, Canoga Park, Calif., assignor to North American Rockwell Corporation Filed Aug. 8, 1966, Ser. No. 570,995
Int. Cl. C22f 1/18
U.S. Cl. 148—133 5 Claims

ABSTRACT OF THE DISCLOSURE

A method for increasing the critical current density of titanium-niobium superconductive alloys by heating a beta-phase titanium-niobium superconductive alloy containing from about 10 to 70 weight percent niobium at a temperature within the phase boundary region between the alpha+beta and beta phases to form a fine-grain beta structure, quenching the alloy to retain this beta structure, and then warm aging the alloy in the alpha+beta phase region to precipitate a homogenously dispersed second phase.

Figure 1:
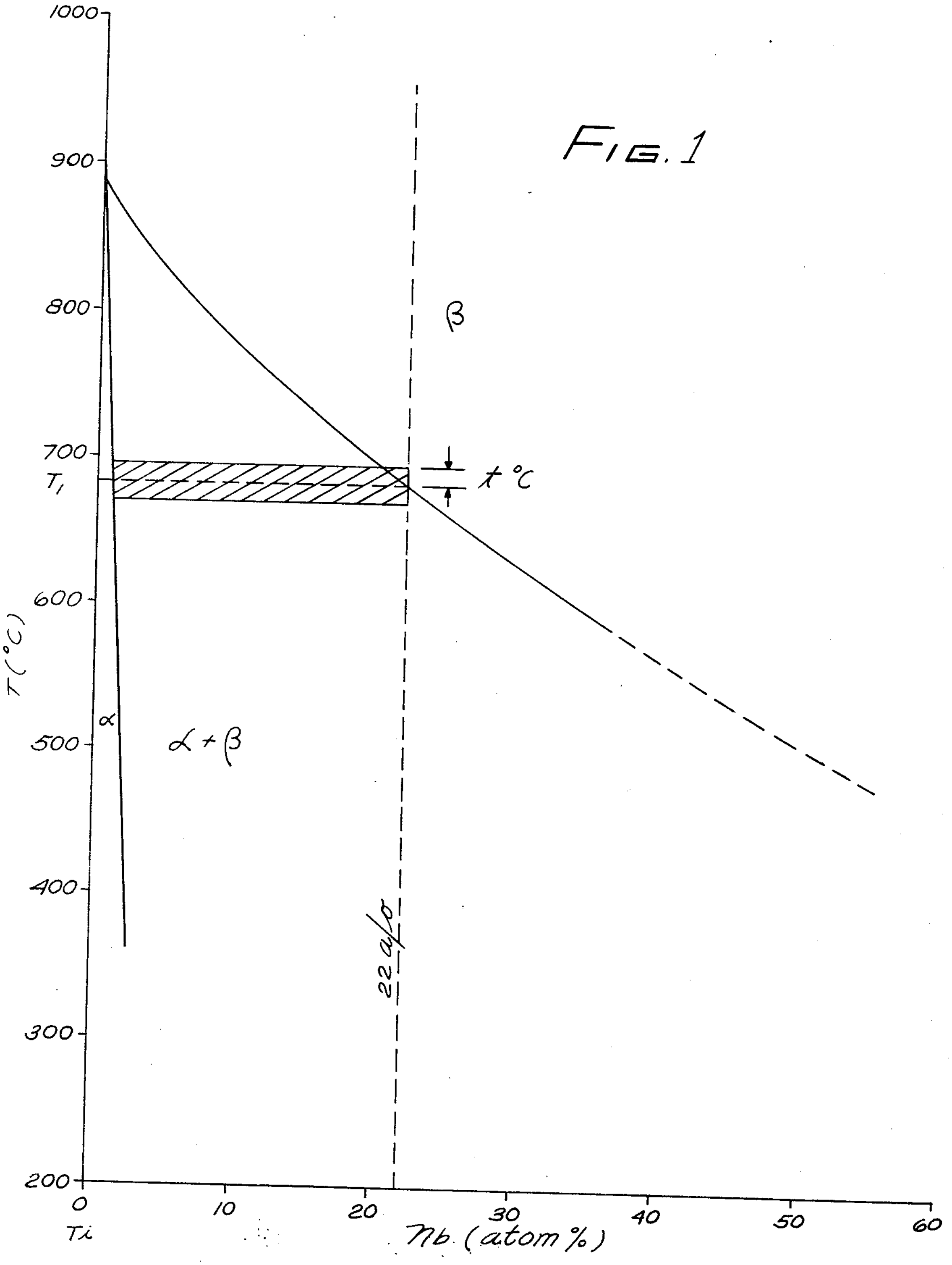

The present invention relates to a method of increasing the superconducting current density of titanium binary superconductive alloys and more particularly to an improved method of heat treating such alloys.

Superconductivity is the characteristic of certain metals to carry extremely large currents in strong magnetic fields without power dissipation, at cryogenic temperatures approaching absolute zero. This characteristic of superconductors provides the basis for compact, powerful magnets which can be used in numerous applications where strong magnetic fields are required, for example, in lasers, masers, accelerators, bubble chambers, and power transformers. Superconductors are normally conductive metals which show a total loss of electrical resistance below a certain critical temperature, $T_c$, and therefore no power dissipation. In contrast, in conventional electromagnets the heat losses due to the resistance of the conductor windings present major problems with respect to magnet efficiency and requirements for auxiliary equipment for heat removal. The absence of power dissipation and heat generation in superconducting magnets offsets the economic requirements for the maintenance of cryogenic temperatures, ordinarily by means of a liquid helium bath.

The normal electrical resistance of a superconductor may be abruptly restored by the superconductor undergoing a superconducting/normal transition, when one of several values is exceeded. The factors affecting superconductivity are the interrelation of magnetic field strength H, current density J, and temperature T. The magnetic field strength, applied externally or generated by the current within the superconductor, limits superconductivity to below certain critical temperatures and current densities. Similarly, at a given current, an increase in field strength above a critical value can terminate superconductivity.

Titanium binary alloys, such as Ti-Nb, Ti-Ta, and Ti-V are known superconductive alloys; titanium-niobium is a particularly attractive superconductor. Whereas many of the known superconducting compositions are brittle, which limits the possibility of forming into useful wire lengths using practical metallurgical techniques, titanium-niobium is ductile and may be readily formed into wire, flat strip, or other desired configurations. Further, based on experimental measurements and related theoretical considerations, this alloy has application as a material for a highfield solenoid because its upper critical magnetic field exceeds that of the zirconium-niobium alloys now in fairly wide use. Titanium-niobium alloys are also less expensive than the zirconium-niobium alloys. However, limiting the actual usefulness of the titanium-niobium alloys are the relatively lower supercurrents which they can carry, as shown on a plot of applied magnetic field versus critical current density.

Methods for increasing the critical current of superconducting alloys by precipitating a discrete second phase in the alloy matrix are disclosed in U.S. Pat. 3,215,569 (Kneip et al.) and the British Pat. 988,204 (Process for the Production of Superconductive Wires and Bands). It is postulated that the fine, uniformly distributed second phase introduced into the superconducting alloy provides magnetic flux pinning sites, which improve transport current conduction by preventing propagation of magnetic eddy currents opposed to current conduction. While such methods of imparting a second phase in titanium-niobium alloys are generally satisfactory, and increase the critical current of the alloy, further current increase is desirable and is theoretically obtainable.

The principal object of the present invention, therefore, is to provide an improved method of heat treating a titanium binary superconductive alloy to produce a distributed second phase in the alloy matrix, whereby the critical current of the alloy is increased. Another object is to provide an improved method of heat treating a titanium binary superconductive aloy to produce a dispersed second phase of finer size and more uniform distribution in the alloy matrix.

Another object is to provide a process of heat treating titanium-niobium alloys to enhance their superconducting current density in high magnetic fields.

Still another object of the present invention is to provide, in a method of warm-aging titanium-niobium to produce a dispersed second phase, a grain refining step which produces an alloy of higher current-carrying capability.

Other objects, features, and advantages of the present invention will become apparent from the following detailed description and the appended claims.

In the drawings, FIG. 1 is a partial phase diagram of the titanium-niobium system, based on that disclosed by M. Hansen et al., Transactions AIME, 191, 881 (1951). This phase diagram shows a beta isomorphic system with a limited solubility of niobium and alpha titanium in a rather extensive alpha+beta field. The other titanium binary superconductive alloys have very similar phase diagrams.

Figure 2:
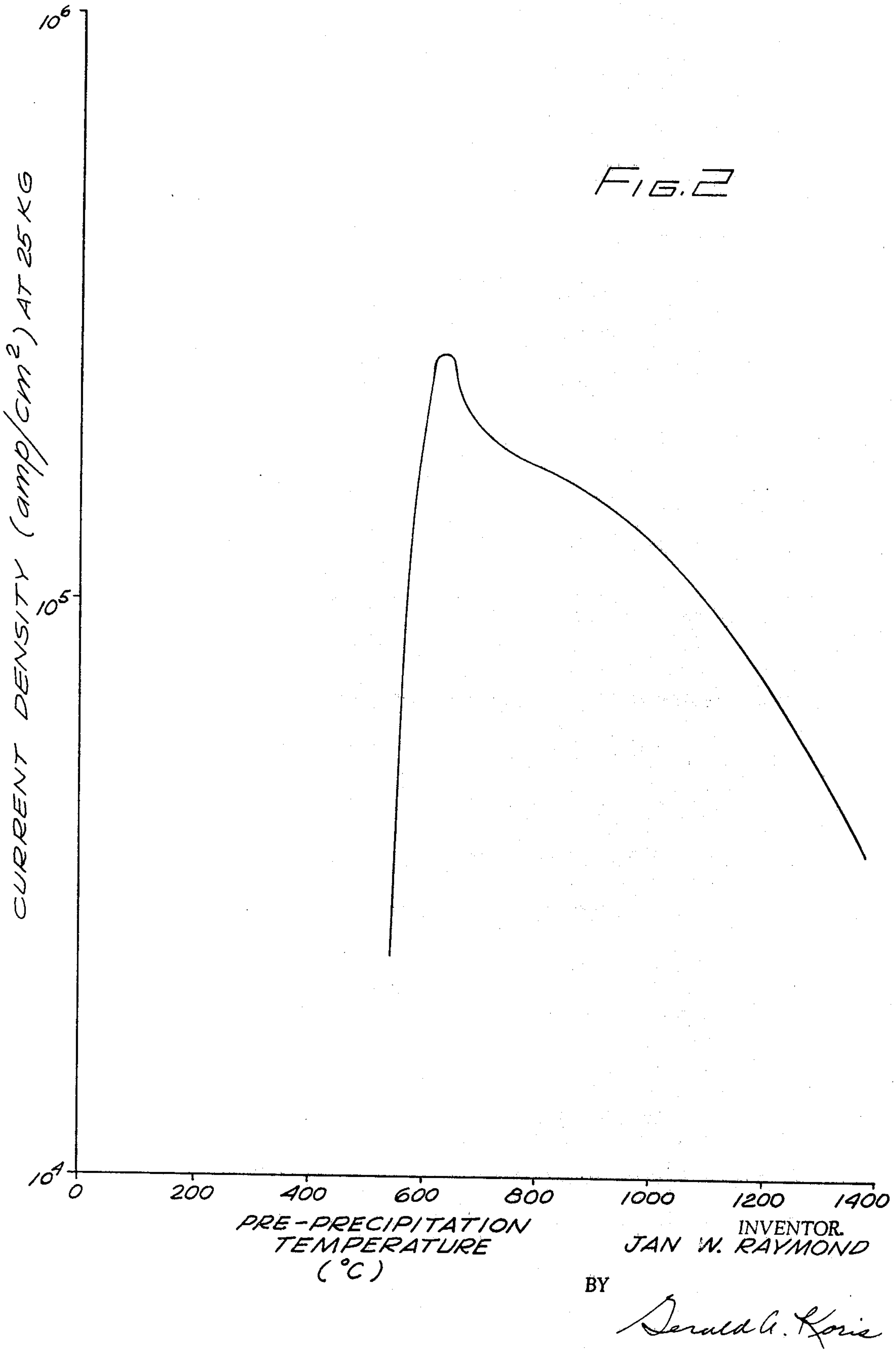

FIG. 2 is a graph which shows the effect on critical current density of the heat treatment which is the subject of this invention.

In accordance with this invention, the critical superconducting current density at high magnetic fields of a titanium binary superconductive alloy may be increased by first heating the alloy at about the phase boundary between the alpha+beta and beta phases prior to the subsequent warm-aging treatment which produces the dispersed precipitate.

Heretofore, although pre-precipitation solution anneal treatments were employed to obtain a homogeneous composition prior to warm aging, no particular significance was atached to the conditions thereof. The alloy was generally solution annealed at a temperature well within the beta region, to obtain a homogeneous beta phase which was ten retained by quenching. For example, the cited British patent recommends a solution anneal at a temperature preferably above 900 C., although the phase boundary of the 22 atom percent niobium-titanium alloy of practical interest occurs at a temperature of about 680° C. While the phase boundary between the alpha and beta regions is shown in FIG. 1 as a single line, this is only for display convenience. The phase boundary may actually be a region which extends ±20° C. from the point on the graph for any given alloy. This is thought to be due to the effects of certain trace impurities such as oxygen, nitrogen, and carbon, which are present in even ultrapure titanium-niobium; these impurities may form ternary or quaternary phases which are interstitially dispersed in the alloy matrix and tend to broaden the phase boundary.

Reference to FIG. 2 reveals how strikingly the pre-preciptation heat treatment affects the ultimate critical current density of the alloy. This curve was obtained from measurements taken on various 22 atom percent Nb-Ti alloys which were given the same warm-aging treatment, the only difference being the temperature of the pre-precipitation heat treatment.

While it is not desired to be held to any particular theory for explaining the strikingly superior results obtained by practice of the present invention, the following mechanism is postulated. Larger and coarser beta grains are obtained by a solution anneal at higher temperatures for longer periods of time within the beta region. As one lowers the solution temperature and approaches the phase boundary a finer structure is obtained. It is further postulated that, during solution annealing, trace impurities that would serve as alpha titanium nucleating sites in the subsequent warm-aging precipitation step tend to migrate from the beta grains to the grain boundaries. By pre-precipitation heat treating at lower temperature (i.e. about the phase boundary), there is less tendency to clear the grains of all the trace impurities, and so later precipitation can occur within the grains as well as at the grain boundaries. Thus, if the original beta structure is a fine grain one, such alpha-nucleating sites will be more widely, uniformly, and finely distributed, thereby yielding a correspondingly finer second phase in the alloy matrix. Where the initial alpha-nucleating sites are not as widely and finely distributed, a coarser grained, more agglomerated second phase is obtained which will not serve as effectively as flux pinning sites.

The present invention is practiced in the following general manner. The titanium-niobium alloys suitable for use may vary considerably in composition from about 10 weight percent niobium to about 70 weight percent niobium, with the balance titanium except for trace impurities. The present invention is particularly satisfactory, however, for the alloys containing about 30–50 weight percent niobium (~18 to 33 atom percent). The alloys may be made by any conventional method of producing high quality and pure material with minimum trace impurities, such as arc, induction, or electron beam melting. It is customary in the art, as indicated in the above-cited references, to solution anneal a titanium-niobium alloy before further treatment or working. The reasons for the treatment are to assure complete transformation to the single phase beta solid solution, to obtain a homogeneous structure, erase the effects of any prior treatment of the alloy in its fabrication or other history, dissolve coarse alpha grains resulting from casting and slow cooling of the alloy, and enhance its workability. Accordingly, a conventional solution anneal (i.e., one well within the beta region, for example at 800° C. for the 22 atom percent Nb-Ti alloy) advantageously precedes the pre-precipitation heat treatment of the present invention.

The alloy is then heat treated in accordance with the present invention. It was found that unexpectedly high currents can be obtained by confining the heat treatment to a temperature below the temperature of the solution anneal and at or near (either above or below) the phase boundary for the particular alloy. For the 22 atom percent Nb-Ti alloy, the transformation temperature is at about 680° C. and the 40 atom percent Nb-Ti alloy has a transformation temperature of about 580° C., as shown in FIG. 1. Because satisfactory results may be obtained by initial heat treatment below the phase boundary where some alpha phase may be present, the terms "pre-precipitation treatment" or "pre-precipitation anneal" are chosen to describe and distinguish this treatment, rather than the term "solution anneal" which necessarily implies heat treating at a higher temperature within the single-phase beta region above the two-phase region.

While it is preferred to perform the heat treatment at the phrase boundary temperature, and optimum current densities are obtained by such treatment, improved results close to the peak may be obtained within a narrow range of temperature above and below the optimum temperature $T_1$, i.e., $T_1 \pm t°$ C., referring to FIG. 1. Inspection of FIG. 2 will indicate that $t°$ C. may be about ±40° C. However, since there is no particular difficulty in controlling the temperature of the pre-precipitation step and better results are obtained at $T_1$, $t°$ C. ordinarily need not be more than about ±20° C., and preferably the temperature should be exactly at the phase boundary for the particular composition, noting that the phase boundary is itself a region as previously discussed.

The pre-precipitation heat treatment is conducted in an inert environment (vacuum or inert gas) for a period of time sufficient to obtain a predominantly fine grain beta structure. This period may vary somewhat with the physical dimensions of the titanium-niobium material and the precise temperature employed; it is generally a period of about 2–4 hours, while about 3 hours is preferred. When the pre-precipitation treatment is completed, the annealed alloy is then rapidly cooled, preferably by water quenching, in order to retain the metastable beta phase at room temperature.

Following the pre-precipitation treatment and quenching, the resulting titanium-niobium alloy is warm aged at a temperature below the temperature of the preprecipitation heat treatment, to obtain precipitation of alpha titanium as a fine, discrete second phase in the beta matrix. The precipitation treatment comprises heating the alloy under inert conditions at a temperature below the beta phase solubility limit for the particular alloy, for a period of time sufficient to obtain alpha precipitation. While the upper temperature limit will vary with the composition of the alloy, as shown in FIG. 1, it is generally satisfactory to heat treat at a temperature of about 300–500° C., while a temperature of about 400° C. is preferred. The time of treatment must be coordinated with the temperature so as to be sufficient to yield the optimum in current-carrying capacity; over-aging results in deleterious coarsening of the second phase precipitate. Generally, treatment times between 2–4 hours coordinated with temperatures between 300–500° C. are suitably employed. A time of about 3 hours coordinated with a temperature of about 400° C. is preferred.

After the warm-aging treatment is concluded, the specimen is brought back to room temperature; quenching is not required to retain the two-phase alpha+beta structure as it is to retain the metastable single-phase beta structure. The titanium-niobium material may then be drawn into a wire or strip, or otherwise cold-worked. The material should not be given further heat treatment, however, since annealing would result in redissolution and loss of the precipitate. The titanium-niobium may, alternatively, be fashioned into final shape after the pre-precipitation treatment and before the warm-aging step. There is some advantage to this because the single-phase beta alloy is more ductile than the precipitated alloy.

The following examples are offered to illustrate the present invention in greater detail.

EXAMPLE I

Crystal bar titanium and electron beam melted niobium were combined in the ratio of 35 weight percent Nb and the remainder Ti, except for trace impurities, and double arc melted to form an ingot approximately 6 in. long by ½ in. diameter. This alloy was then solution annealed 3 hours at 800° C. under vacuum and water quenched. After reduction to 0.015 in. by cold swaging and drawing, the resultant wire was cut into convenient lengths and pre-precipitation heat treated. The heat treatment comprised heating the samples under vacuum for three hours at the various temperatures shown below, followed by air quenching. These test samples were then warm aged for three hours under vacuum at 400° C. to obtain precipitation of a dispersed second phase of alpha titanium.

The test specimens were mounted for critical current tests in a transverse magnetic field. To accomplish this, a sample was joined to copper wire leads by an indium soldered cold press joint, and potential probes were attached to the sample by indium soldering. The sample was bent in a U-shape and mounted in epoxy resin for stability. A protective shunt with approximately 0.3 ohns resistance was soldered across the current leads to prevent damage to the specimen from a superconducting-to-normal transition. This assembly was inserted in the core of a superconducting magnet in a liquid helium-containing flask. Current was supplied to the specimen from a bank of batteries and was controlled through a series of adjustable carbon block resistors. The superconducting-to-normal transition was detected with a microvoltmeter connected to the potential probes across the sample, with the critical current being taken as the value of current when an abrupt potential drop across the shunt was observed. The results obtained in a 15-kilogauss external magnetic field are tabulated below. It is seen that below about 620° C. and above about 700° C. the current drops sharply and that best results are obtained at 660 +20° C.

| Pre-precipitation annealing temperature (°C.): | Critical current density (amp./cm.$^2$) |
|---|---|
| 550 | $0.50\times10^5$ |
| 600 | $2.25\times10^5$ |
| 620 | $2.60\times10^5$ |
| 640 | $2.67\times10^5$ |
| 660 | $2.81\times10^5$ |
| 680 | $2.67\times10^5$ |
| 700 | $2.46\times10^5$ |
| 800 | $2.11\times10^5$ |
| 900 | $2.00\times10^5$ |
| 1300 | $0.60\times10^5$ |

For comparison purposes, a 35 Nb-Ti alloy prepared in the same manner was solution annealed and warm aged and test readings then taken. A ½-in. diameter sample was solution annealed at 800° C. for 3 hours and then cold-worked down to 0.015 in. in diameter. The material was then warm aged 3 hours at 400° C. The critical current versus external field strength data is presented below. It is noted that at 15 kilogauss, a current reading of $1.81\times10^5$ amp./cm.$^2$ was obtained, as contrasted with a reading of $2.81\times10^5$ for a sample prepared in accordance with the present invention.

| Field strength (kg.): | Current density (amp./cm.$^2$.) |
|---|---|
| 0 | $3.82\times10^5$ |
| 10 | $2.17\times10^5$ |
| 15 | $1.81\times10^5$ |
| 20 | $1.48\times10^5$ |
| 25 | $1.15\times10^5$ |

EXAMPLE II

The procedures of Example I were followed except that the samples were tested in an applied magnetic field of 25 kilogauss. The following results were obtained.

| Pre-precipitation annealing temperature (° C.): | Critical current density (amp/cm.$^2$) |
|---|---|
| 550 | $0.28\times10^5$ |
| 600 | $1.83\times10^5$ |
| 620 | $2.04\times10^5$ |
| 640 | $2.04\times10^5$ |
| 660 | $2.18\times10^5$ |
| 680 | $2.11\times10^5$ |
| 700 | $1.97\times10^5$ |
| 800 | $1.70\times10^5$ |
| 900 | $1.50\times10^5$ |
| 1300 | $0.50\times10^5$ |

It is noted from the comparative test made on conventionally prepared material in Example I that at a field of 25 kg. a current reading of 1.15 amp/cm.$^2$ was obtained, whereas almost double the current density ($2.18\times10^5$ amp/cm.$^2$) was obtained on alloy heat treated in accordance with the present invention at 660° C.

The foregoing examples are in illustration of the present invention and should not be considered as restrictive thereof, as variations in methods and techniques will suggest themselves to those skilled in the art. The invention should, therefore, be accorded the scope defined by the following claims.

The following is claimed:

1. A method for increasing the critical current density of a titanium binary superconductive alloy consisting of about 10–70 weight percent niobium and the remainder titanium except for trace impurities wherein said alloy consisting essentially of beta phase is warm-aged in the alpha+beta phase region to precipitate a homogeneous dispersed second phase therein, wherein the improvement comprises, prior to the warm-aging of said alloy, heating the beta phase alloy in an inert environment at a temperature within about +40° C. of the phase boundary between the alpha+beta and beta phases for a period sufficient to yield a predominantly fine-grain beta structure, and quenching said alloy to retain said fine grain beta structure.

2. The method of claim 1 wherein said temperature is about ±20° C. of said phase boundary.

3. The method of claim 1 wherein said temperature is about at said phase boundary.

4. The method of claim 1 wherein said titanium binary alloy consists essentially of about 18–33 atomic percent niobium and the remainder titanium except for trace impurities.

5. The method of claim 1 wherein said heating is conducted for a period of about 2–4 hours.

References Cited

UNITED STATES PATENTS

| | | | |
|---|---|---|---|
| 2,968,586 | 1/1961 | Vordahl | 148—158 X |
| 2,974,076 | 3/1961 | Vordahl | 148—158 X |
| 3,215,569 | 11/1965 | Kneip et al. | 75—174 X |
| 3,268,373 | 8/1966 | Reynolds | 148—32.5 |

CHARLES N. LOVELL, Primary Examiner

U.S. Cl. X.R.

148—12.7, 32.5